(12) United States Patent
Gabber et al.

(10) Patent No.: US 6,591,291 B1
(45) Date of Patent: Jul. 8, 2003

(54) SYSTEM AND METHOD FOR PROVIDING ANONYMOUS REMAILING AND FILTERING OF ELECTRONIC MAIL

(75) Inventors: Eran Gabber, Summit; Phillip B. Gibbons, Westfield; David Morris Kristol, Summit, all of NJ (US); Yossi Matias, Potomac, MD (US); Alain J. Mayer, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/041,209

(22) Filed: Mar. 12, 1998

Related U.S. Application Data

(60) Provisional application No. 60/057,132, filed on Aug. 28, 1997.

(51) Int. Cl.[7] .......................... G06F 13/38; G06F 15/17
(52) U.S. Cl. ...................... 709/206; 709/207; 709/219; 709/238; 709/245; 709/249; 709/247; 379/93.01; 380/24; 380/25; 380/49; 710/68; 345/202; 345/523; 370/393; 713/201
(58) Field of Search ................................. 709/245, 206, 709/207, 249, 238, 219; 379/93.01; 380/24, 25, 49

(56) References Cited

U.S. PATENT DOCUMENTS

| | | | |
|---|---|---|---|
| 5,148,479 A | * 9/1992 | Bird et al. .................... 380/23 |
| 5,444,782 A | * 8/1995 | Adams, Jr. et al. ........... 380/49 |
| 5,559,962 A | * 9/1996 | Okamura et al. ...... 395/200.06 |
| 5,586,036 A | * 12/1996 | Pintsov ................. 364/464.02 |
| 5,604,803 A | * 2/1997 | Aziz ........................... 380/25 |
| 5,642,420 A | * 6/1997 | Kuroda et al. ................. 380/30 |
| 5,675,631 A | * 10/1997 | Kaminsky et al. ............. 379/67 |

(List continued on next page.)

FOREIGN PATENT DOCUMENTS

EP 905943 * 3/1999 ........... H04L/12/58

OTHER PUBLICATIONS

Paul. A. Strassmann, Risk–Free Access into the global information infrastructure via anonymous re–mailers, www-.strassmann.com/plus/anon–remail.html, total 9 pages, Jan. 28, 1996.*

Article entitled "Security Without Identification: Transaction Systems to Make Big Brother Obsolete" by David Chaum, from Communications of the ACM, Oct. 1985, pp. 1030–1044.

Article entitled "Privacy–Enhancing Technologies for the internet" by Ian Goldberg, David Wagner and Eric Brewer of the University of California, Berkeley.

Article entitled "Netbill Security and Transaction Protocol" by Benjamin Cox. J.D. Tygar and Marvin Sirbu of Carnagie Mellon University.

Article entitled "How to Construct Random Functions" from the Journal of the Association for Computing Machinery, by Oded Goldreich, Shafi Goldwasser and Silvio Micali, Oct. 1986, pp. 792–807.

(List continued on next page.)

*Primary Examiner*—Bunjob Jaroenchonwanit
(74) *Attorney, Agent, or Firm*—Hitt, Gaines & Boisbrun

(57) ABSTRACT

A system for, and method of, generating an alias source address for an electronic mail ("e-mail") message having a real source address and a destination address and a computer network, such as the Internet, including the system or the method. In one embodiment, the system includes an alias source address generator that employs the destination address to generate the alias source address. The system further includes an alias source address substitutor that substitutes the alias source address for the real source address. This removes the real source address from the e-mail message and thereby renders the sender, located at the real source address, anonymous. Further-described are systems and methods for forwarding reply e-mail and filtering reply e-mail based on alias source address.

32 Claims, 2 Drawing Sheets

U.S. PATENT DOCUMENTS

| | | | |
|---|---|---|---|
| 5,742,686 A | * 4/1998 | Finley | 380/28 |
| 5,751,960 A | * 5/1998 | Matsunaga | 709/306 |
| 5,757,924 A | * 5/1998 | Friedman et al. | 380/49 |
| 5,761,201 A | * 6/1998 | Vandreuil | 370/392 |
| 5,768,526 A | * 6/1998 | Fawcett | 709/229 |
| 5,812,795 A | * 8/1998 | Horovitz et al. | 709/245 |
| 5,822,526 A | * 10/1998 | Waskiewicz | 709/206 |
| 5,850,526 A | * 12/1998 | Chou | 709/247 |
| 5,907,677 A | * 5/1999 | Glenn et al. | 709/206 |
| 5,928,325 A | * 7/1999 | Shaughnessy et al. | 709/206 |
| 5,930,479 A | * 7/1999 | Hall | 709/238 |
| 5,944,787 A | * 8/1999 | Zoken | 709/206 |
| 5,946,679 A | * 8/1999 | Ahuja et al. | 707/3 |
| 5,953,420 A | * 8/1999 | Matyas, Jr. et al. | 380/21 |
| 5,958,005 A | * 9/1999 | Thorne et al. | 709/202 |
| 5,974,448 A | * 10/1999 | Yamauchi et al. | 709/206 |
| 5,983,350 A | * 11/1999 | Minear et al. | 713/201 |
| 5,999,932 A | * 12/1999 | Paul | 707/10 |
| 6,021,427 A | * 2/2000 | Spagna et al. | 709/206 |

OTHER PUBLICATIONS

Article entitled "Proceedings Symposium on Network and Distributed System Security" by the IEEE Computer Society Press: Feb. 22–23, 1996: pp. 1–16.

Article entitled "Anonymous Connections and Onion Routing" IEEE Symposium on Security and Privacy: by Paul F. Syverson, David M. Goldschlag and Michael G. Reed, Naval Research Library, pp. 1–11.

Article entitled "Frequently Asked Questions about Mixmaster Remailers" FAB Verson 1.8. Jul. 4, 1996.

"How to Make Personalized Web Browsing Simple, Secure, and Anonymous" by Eran Gabber, Phillip B. Gibbons, Yossi Matias, Alain Mayer; pp. 17–31; Feb. 1997.

"How to be Virtually Anonymous" by Randal L. Schwartz; Feb. 1997; pp. 30–33.

"Private Web Browsing" by Paul F. Syverson, Michael G. Reed, David M. Goldschlag; 1997; pp. 237–248.

"Anonymous Connections and Onion Routing" by Paul F. Syverson, David M. Goldschlag and Michael G. Reed; May 1997; pp. 44–54.

* cited by examiner

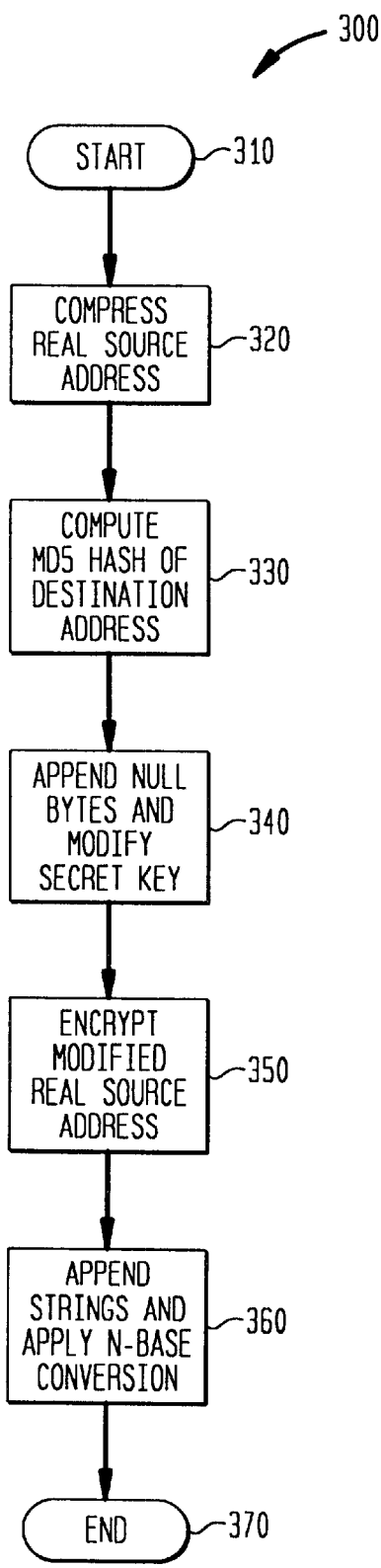
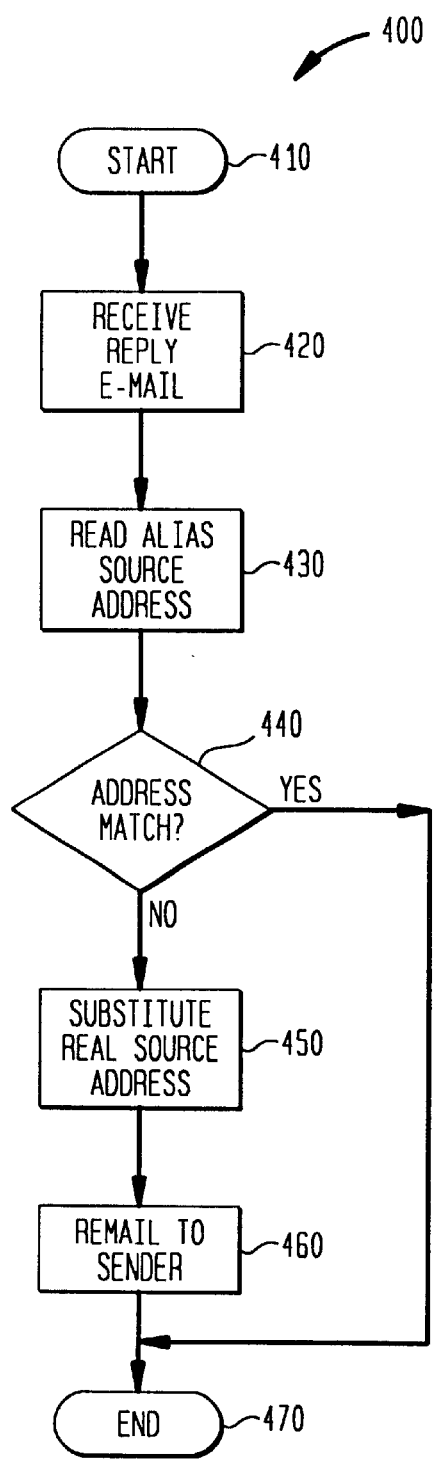

SYSTEM AND METHOD FOR PROVIDING ANONYMOUS REMAILING AND FILTERING OF ELECTRONIC MAIL

CROSS REFERENCE TO RELATED APPLICATION

This applications claims the benefit of U.S. Provisional Application Ser. No. 60/057,132, filed on Aug. 28, 1997, and entitled "System and Method for Providing Anonymous Remailing and Filtering of Electronic Mail," commonly assigned with the present invention and incorporated herein by reference.

The present invention is also related to that disclosed in Ser. No. 08/787,557, filed on Jan. 22, 1997, entitled "System and Method for Providing Anonymous Personalized Browsing in a Network" and commonly assigned with the present invention.

TECHNICAL FIELD OF THE INVENTION

The present invention is directed, in general, to computer networks and, more specifically, to a system and method that provides for anonymous transmission of electronic mail ("e-mail") over a network and filtering of incoming e-mail based, at least in part, on the destination address of the e-mail.

BACKGROUND OF THE INVENTION

In recent years, the availability of more efficient, reliable and cost-effective computers and networking tools has allowed many companies and individuals (collectively, "users") to become involved in an ever-growing electronic community. The immeasurable gains in technology experienced by the computer industry overall have allowed these users to rely on commercially available computers, such as personal computers ("PCS"), to meet their information processing and communication needs. To that end, PC manufacturers allow users to equip most PCS with an interface (such as a modem) that may be used for communication over networks, such as the Internet. The Internet is a well-known collection of networks (e.g., public and private voice, data, video and multimedia networks) that cooperate using common protocols to form a worldwide network of networks.

Cooperation often includes the communication of electronic mail ("e-mail") from one user (a "sender") to another (a "recipient"). One conventional e-mail protocol employed over the Internet, Standard Mail Transfer Protocol ("SMTP"), mandates that each e-mail message body have a header that includes the sender's e-mail address (a "source address") and the recipient's e-mail address (a "destination address"). All well-known e-mail protocols mandate inclusion of a source address to allow the recipient to send e-mail back to the sender.

Privacy has become a primary concern in today's computer-based society. Users want to be able to express themselves in words, sounds or pictures over a computer network, but may not want to be identified as the source. In particular, users want to keep their true identity secret, but still wish to receive e-mail addressed to them. This need for privacy spans the spectrum of communication, from business transactions to personal thoughts. Unfortunately, mandated inclusion of the source address with the sender's e-mail gives away the sender's identity, compromising privacy.

One solution to this problem is a so-called "anonymous remailer." An anonymous remailer is a computer system, coupled to the network, that allows bidirectional e-mail communication over the network without compromising the sender's identity. The recipient cannot discover the true identity of the sender unless the sender encloses identifying information in the body of the e-mail message itself.

Anonymous remailing is well known in the art. The most famous Internet remailer to date has been the Finnish "anon.penet.fi" remailer, which, at its zenith, boasted more than 500,000 users.

To support bidirectional e-mailing, conventional remailers must maintain a translation table that correlates real user addresses and alias source addresses (usually taking the form "xxxxxx@remailer.address"). Upon receipt of a message from an anonymous sender, the remailer replaces the sender's real source address with a corresponding alias source address and remails the message to the intended recipient. The recipient can reply to the message, but only by using the anonymous sender's alias source address. Upon receipt of a reply from the recipient, the remailer substitutes the anonymous sender's real source address for the alias source address and remails the reply to the anonymous sender.

The main problem with conventional remailers is the translation table itself. Because the table contains detailed real source addresses and the correlations between such real source addresses and alias source addresses, both hackers and law enforcement agencies covet it. Thus, the person maintaining the remailer must both protect the translation table from hackers and face thorny legal questions about the privacy of the senders who trust him to protect their true identity.

Even though a sender may preserve his anonymity by using an anonymous remailer, he still may be subjected to receiving a barrage of unsolicited, usually computer-generated e-mail ("junk" e-mail or "spam," in today's Internet parlance), because the sender still may be reached via his alias source address. Currently, the only automatic way to protect against such unsolicited e-mail is to filter based on the source address contained in the header or specific words contained in the body. Unfortunately, filtering based on source address or words in the body of the message is crude at best, risking both the unintended deletion of valid e-mail messages and unintended retention of junk. Of course, manual filtering remains an option, but at the cost of time and with the risk of exposure to any offensive subject matter contained in such e-mail messages.

Therefore, what is needed in the art is an improved remailer, a method of remailing and a more effective way to filter unsolicited e-mail messages automatically.

SUMMARY OF THE INVENTION

To address the above-discussed deficiencies of the prior art, the present invention introduces a system for and method of, generating an alias source address for an electronic mail ("e-mail") message having a real source address and a destination address and a computer network, such as the Internet, including the system or the method. In one embodiment, the system includes an alias source address generator that employs the destination address to generate the alias source address. The system further includes an alias source address substitutor that substitutes the alias source address for the real source address. This removes the real source address from the e-mail message and thereby renders the sender, located at the real source address, anonymous. The system further includes an e-mail forwarder that receives e-mail addressed to the alias source address, computes the real source address, and forwards the e-mail to the real source address.

The sender is therefore provided with a set of alias source addresses that may, in some embodiments of the present invention, be unique to each destination address. However, since the system automatically provides generation and substitution of source addresses, the user is freed of the task of tracking multiple alias source addresses.

In one embodiment of the present invention, the alias source address includes an encrypted version of the real source address, among other information. In this way, the e-mail forwarder can compute the real source address given the alias source address without any need for a translation table from alias source addresses to real source addresses. Another advantage of this embodiment is that the alias generator does not have to communicate with the e-mail forwarder. Thus the system may comprise any number of alias generators and any number of e-mail forwarders. Alias generators and e-mail forwarders may be added and removed from the system at any time.

In one embodiment of the present invention, the system further includes an e-mail filter capable of filtering incoming reply mail based on the alias source address. By causing the alias source address to depend upon the destination address, a single sender can have a set of different alias source addresses, allowing the sender to filter incoming reply mail, if he so desires, based upon alias source address. Purveyors of junk e-mail can obscure their identity or the content of an unwanted message by many means, but if they want to send e-mail successfully to that sender, they must address it to the sender's exact same alias source address. The alias source address, when thus used as a destination address, provides users an effective way to filter junk e-mail and to determine, if they so desire, where the junk e-mail purveyor obtained the alias source address.

The ability to filter e-mail based on the alias source address is independent of the particular method of generation of the alias source address. To allow e-mail filtering by this method, the alias source address should depend upon the destination address. The alias source address generator may advantageously have one or more of the following three attributes: (1) consistency (the same alias is presented to the same destination), (2) uniqueness (the probability is low that two destinations are given the same alias) and (3) privacy (the recipient cannot determine the real source address given the alias source address).

In one embodiment of the present invention, the system takes the form of a remote anonymous remailer with which the sender must communicate over a network. In an alternative embodiment, the system executes locally on the sender's computer. As the sender generates e-mail messages, alias source addresses are determined and added, eliminating a need for the remote anonymous remailer.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, wherein like numbers designate like objects, and in which:

FIG. 3 illustrates a flow diagram of one specific embodiment of a method of generating an alias source address for an e-mail message having a real source address and a destination address; and FIG. 4 illustrates a flow diagram of one specific embodiment of a method of filtering unwanted e-mail messages based on alias source addresses and forwarding e-mail to the real source address.

DETAILED DESCRIPTION

Figure 1:
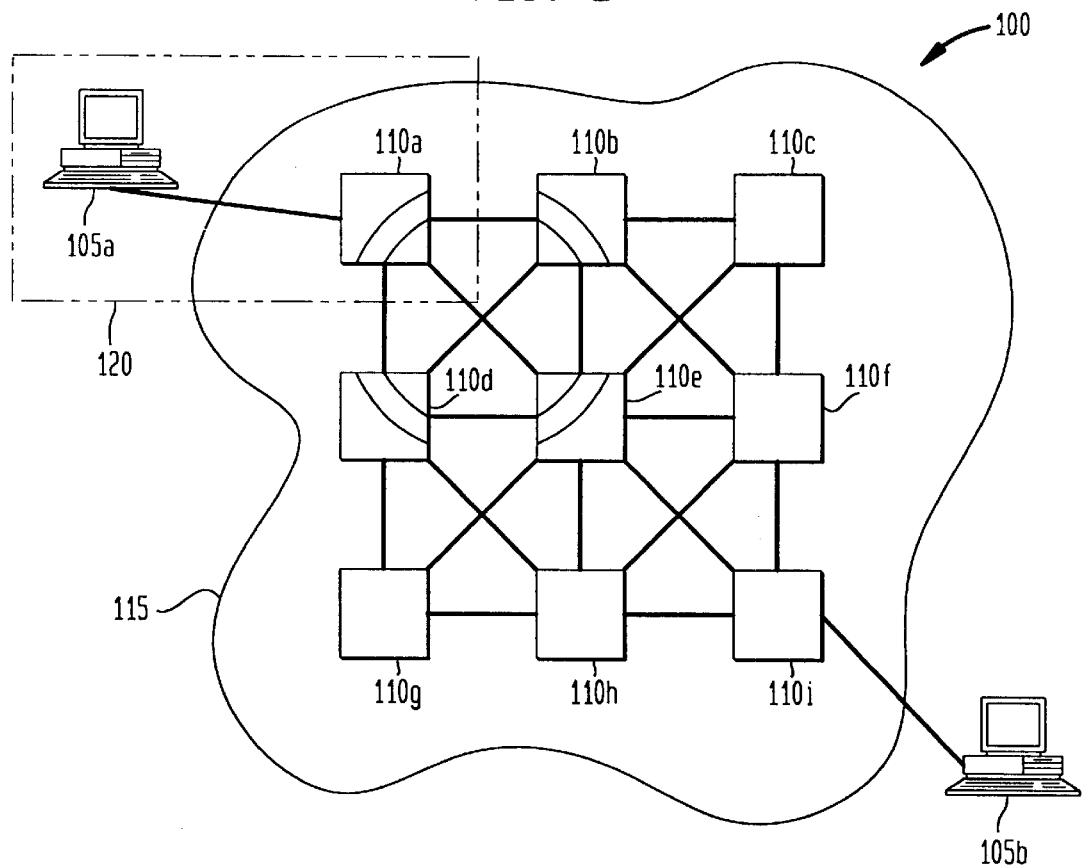
FIG. 1 illustrates a high-level block diagram of an exemplary distributed network with which the principles of the present invention may be suitably used.

Referring initially to FIG. 1, illustrated is a high-level block diagram of an exemplary distributed network (generally designated 100) with which the principles of the present invention may be suitably used to provide an anonymous remailer that operates without a translation table and assigns destination-dependent alias source addresses to a sender's e-mail. The distributed network 100 illustratively includes a plurality of computer systems 110a, 110b, 110c, 110d, 110e, 110f, 110g, 110h, 110i that are illustratively coupled together to form the Internet 115. The Internet 115 includes the World Wide Web, which is not a network itself, but rather an "abstraction" maintained on top of the Internet 115 effected by a combination of browsers, server sites (as may be hosted on the plurality of computer systems 110a, 110b, 110c, 110d, 110e, 110f, 110g, 110h, 110i), HyperText Markup Language ("HTML") pages and the like.

Although the illustrated embodiment is suitably implemented for and used over the Internet 115, the principles and broad scope of the present invention may be associated with any appropriately arranged computer, communications, multimedia or other network, whether wired or wireless. Further, though the principles of the present invention are illustrated using a single computer system, such as one of the plurality of computer systems 110a, 110b, 110c, 110d, 110e, 110f, 110g, 110h, 110i, alternate embodiments within the scope of the same may include more than a single computer system.

The exemplary network 100 is assumed to include a plurality of (assumed) insecure communication channels that operate to intercouple ones of the various computer systems 110a, 110b, 110c, 110d, 110e, 110f, 110g, 110h, 110i of the network 100. The concept of communication channels is known and allows insecure communication of information among ones of the intercoupled computer systems (the Internet employs conventional communication protocols, such as SMTP, that are also known). A distributed network operating system executes on at least some of computer systems 110a, 110b, 110c, 110d, 110e, 110f, 110g, 110h, 110i and may manage the insecure communication of information therebetween. Distributed network operating systems are also known.

FIG. 1 also illustrates first and second user's computer systems 105a, 105b, which are assumed, for purposes of the following discussion, to be associated with an e-mail sender and an e-mail recipient, respectively. Thus, a sender may apply his real source address and a destination address corresponding to the recipient to a particular e-mail message and send the e-mail message to the recipient via the network 100 and the second user's computer.

The first user's computer system may be associated with a particular computer system 110a (such association denoted by a broken line 120. The particular computer system 110a acts as a home site for the first user's computer system and a provider of Internet service.

Figure 2:
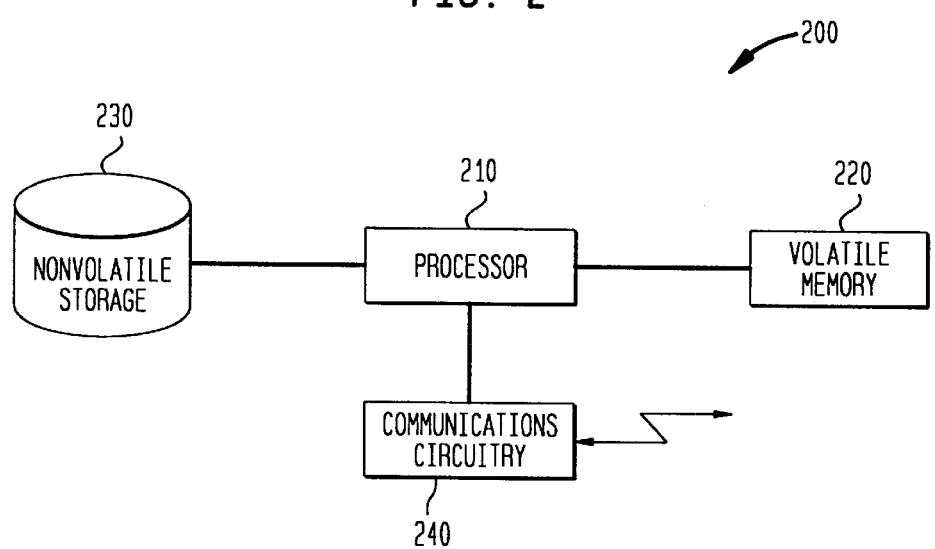
FIG. 2 illustrates a block diagram of a computer system that may be employed in the network of FIG. 1 to provide an environment within which the present invention can operate.

Turning now to FIG. 2, illustrated is a block diagram of data processing and storage circuitry, generally designated 200, that may be employed in the network of FIG. 1 to provide an environment within which the present invention can operate. The circuitry 200 comprises a processor 210, volatile memory 220, a nonvolatile mass storage unit 230 and communication circuitry 240.

The circuitry 200 illustrated in FIG. 2 is intended to represent a wide array of computing platforms. Accordingly, the circuitry 200 may be a mainframe, minicomputer or personal computer ("PC"). The present invention is not limited whatsoever to a particular class of computing platform. With reference back to FIG. 1 and continuing reference to FIG. 2, each of the plurality of computer systems 110a, 110b, 110c, 110d, 110e, 110f, 110g, 110h, 110i and the first and second user's computer systems 105a, 105b may have the circuitry illustrated in FIG. 2 associated therewith.

The present invention may be embodied as a sequence of instructions executable in the data processing and storage circuitry 200 to yield an alias source address generator, an alias source address substitutor, a real source address generator, a real source address substitutor and an e-mail filter as the present invention provides.

Turning now to FIG. 3, illustrated is a flow diagram of one highly specific embodiment of a method, generally designated 300, of generating an alias source address for an e-mail message having a real source address and a destination address. The method 300 may be embodied in an alias source address generator.

It should be stated at this point in the discussion that the method 300 is nothing more than one example of a way to generate an alias source address from a real source address. The present invention requires none of the specifically-recited steps. Instead, the present invention requires only that the resulting alias source address depend on the destination address. The alias source address generator may advantageously have one or more of the following three attributes: (1) consistency (the same alias is presented to the same destination), (2) uniqueness (the probability is low that two destinations are given the same alias) and (3) privacy (the recipient cannot determine the real source address given the alias source address).

The method begins in a start step 310, wherein an e-mail message to be remailed is received from a sender at a remailer that operates according to the principles of the present invention. The sender's real source address is read from the e-mail message and compressed in a step 320 to ensure that the alias source address that results when the method 300 is complete is not excessively long. Compression may, in the illustrated embodiment, be variable-length compression that depends upon the character set used in the sender's mailbox name, domain name and top-level domain. The compression step is, of course, purely optional.

Following compression, the method 300 continues in a step 330, wherein a hash value of the destination address of the e-mail message is computed by means of the well-known MD5 algorithm. The destination address may be the domain part of a destination e-mail address, or it may be the host part of a Uniform Resource Locator ("URL") of a World Wide Web form that asks the user to provide an e-mail address. From the MD5 hash value, two non-overlapping bit fields are obtained. In the illustrated embodiment, the first bit field is two bits long and the second bit field is eight bits long.

Like compression, computation of a hash value is purely optional. The only important aspect of the step 330 is that the alias source address is caused to be based on the destination address of the e-mail message. Modification of the destination address is not required to base the alias source address thereon (as will be seen below in the description of a more trivial method).

Next, in a step 340, n null bytes are appended to the compressed real source address, where n equals the value of the first bit field. Appending the null bytes obscures the true length of the real source address. Also in the step 340, the second bit field is appended to a secret key stored locally in the remailer, thereby producing an expanded secret key unique to the destination address. While appending null bytes obscures the true length of the real source address, appending is unnecessary to the broad scope of the present invention.

Next, in a step 350, the compressed real source address (with appended null bytes) is encrypted according to, for example, the Data Encryption Standard ("DES") using the expanded secret key unique to the destination address as an encryption key. Multiple DES passes may be employed further to enhance security.

Of course, the type of encryption applied is unimportant. Encryption does need not to be DES and does not need to be symmetrical. In fact, the present invention does not require encryption whatsoever.

Next, in a step 360, the second bit field is appended to the encrypted compressed real source address. The result is passed through an m-base conversion (m being any desired number) to obtain a desired string. For a printable alphanumeric string including both uppercase and lowercase characters, a base-64 conversion can be used. If only lowercase or only uppercase characters are desired, a base-32 conversion can be used.

The method 300 ends in an end step 370, derivation of the alias source address having been accomplished. As with all of the other steps 310, 320, 330, 340, 350, the step 360 is unnecessary, unless the desired result is an alias source address consisting of a printable string of characters.

The alias source address may then be substituted for the real source address, perhaps with an alias source address substitutor.

Employing the above-described exemplary method 300 to an e-mail message having a real source address of, for example, "foo_bar@bell-labs.com" and a destination address of "www.yahoo.com" can be converted to "wxOnlqlUUEXJxzwVSsfKgW". This can be pre-appended to the domain name and top-level domain of an exemplary remailer to yield: "wxOnlqlUUEXJxzwVSsfKgW@lpwa.com", a destination-address-specific, SMTP-valid, alias source address.

Employing a less complex method wherein the compressing, hashing, appending and encrypting, as set forth in the method 300 above, do not occur can yield different results. For example, an e-mail message having a real source address of, for example, "foo_bar@bell-labs.com" and a destination address of "www.yahoo.com" can be converted to "foo_bar.bell-labs.com.www. yahoo-.com" (nothing more than a trivial string concatenation). This can be pre-appended to the domain name and top-level domain of an exemplary remailer to yield:

"www.yahoo.com.foo_bar.bell-labs.com@lpwa.com". This far less complex (and less secure) method falls well within the broad scope of the present invention, as well. Note that the steps set forth in the method 300 are not employed in the less complex method.

Several things regarding the above-described method 300 should be noted. First, the secret key is the only data required to be stored at the remailer site. All of the remaining data are contained in the e-mail message itself. Thus, the translation table of conventional remailers is avoided. The secret key can, in fact, be compiled into the software that constitutes the remailer.

Second, many World Wide Web sites impose limits on the length of an e-mail address they will accept in a form. Since the method 300 produces an alias source address that is longer than the real source address, the real source address is initially compressed to reduce the extent to which the length of the alias source address exceeds the length of the real source address. Should certain sites truncate the resulting alias source address, reply mail employing the truncated alias source address will be lost.

Third, the number of distinct destination-address-specific alias source addresses generated for the same real source address is limited to two to the power of n, where n is the total length of the bit fields computed in step 330. In the illustrated embodiment, the number of destination-address-specific alias source addresses generated for the same real source address is 1024. This should prove adequate for most purposes. If the second bit fields were longer, the alias source address space would correspondingly increase. However, it should particularly be noted that the resulting alias source addresses remain unique to the sender, even if they do overlap destinations.

Fourth, the above-described method 300 employs DES, a well-known secret key encryption algorithm that conventionally operates on a 56 bit key. Since eight of the bits come from the second bit field, the secret key is 48 bits long. If encryption stronger than effective 48 bit DES is desired, multiple DES passes can be used.

The step 350 of the above described method 300 may employ other symmetric encryption algorithms, such as IDEA, or an asymmetric encryption algorithms, such as RSA, instead of DES. Furthermore, the step 350 of the above described method 300 may employ other one-way hash functions, such as SHA, instead of MD5. Also, the steps 310, 320, 330, 340, 350, 360 of the method 300 may performed in any order, omitted or performed multiple times, as may be appropriate to degrade or enhance security, anonymity, speed or complexity or to accommodate other design considerations.

Finally, it should be noted that the method 300 is fully reversible, allowing an alias source address (usually contained in a reply e-mail) to be translated back into a real source address for forwarding back to the original sender. This is accomplished by reversing the m-base conversion, stripping the second bit field, decrypting (or multiply-decrypting) the resulting string using the stored secret key and appended second bit field, stripping the null bytes and, finally, decompressing the result to yield the real source address. It should be understood, however, that the present invention is not limited to reversible methods, and can be made only to support unidirectional remailing.

Turning now to FIG. 4, illustrated is a flow diagram of one embodiment of a method, generally designated 400, of filtering unwanted e-mail messages based on alias source addresses and forwarding e-mail messages to the real source address. The method 400 may be carried out in an e-mail filter. The described embodiment of the e-mail forwarder consists of the real source address generator and the real source address substituter.

In one embodiment of the present invention, the system further includes an e-mail filter capable of filtering incoming reply mail based on the alias source address. By causing the alias source address to depend upon the destination address, a single sender can have different aliases, allowing the sender to filter incoming reply mail, if he so desires, based upon the alias source address. Purveyors of junk e-mail can obscure their identity or the content of an unwanted message by many means, but if they want their e-mail to be returned successfully to the sender at his real source address, they are constrained to use exactly the same alias source address, thereby providing an effective basis for filtering junk e-mail and determining, if they so desire, from what destination address the purveyor obtained the alias source address.

At this point, terminology can become confusing, because, in the context of a reply, the recipient of the original e-mail message originates a reply e-mail message and thereby becomes a sender in his own right. Accordingly, to reduce the confusion, the recipient will continue to be called the "recipient" and the sender will continue to be called the "sender," even though it is understood that the reply e-mail is traveling from the "recipient" to the "sender."

Accordingly, the method 400 begins in a start step 410 and proceeds to a step 420, wherein a reply e-mail message is received from the recipient. The method 400 continues in a step 430, wherein the alias source address is read from the reply e-mail message. Next, the alias source address is compared to alias source addresses contained in a sender-supplied list of rejected alias source addresses in a decisional step 440.

If the alias source address matches one of the items in the list (taking the YES branch of the decisional step 440, the reply e-mail is deleted and the sender spared of its receipt. If the alias source address does not match any of the items in the list (taking the NO branch of the decisional step 440, the method continues in a step 450 wherein the sender's real source address is derived (perhaps by reversing the exemplary method 300 described above or perhaps by way of a real source address generator that generates a real source address from an alias source address) and substituted into the reply e-mail for the alias source address, perhaps by way of a real source address substitutor.

Next, the reply-e-mail is forwarded to the sender in a step 460. The method ends in an end step 470, filtered forwarding having been accomplished.

As with the method 300, the steps 410, 420, 430, 440, 450, 460 of the method 400 may performed in any order, omitted or performed multiple times, as may be appropriate to degrade or enhance security, anonymity, speed or complexity or to accommodate other design considerations.

In an alternative method to the above, the remailer can simply move the alias source addresses of reply e-mail to a field in the header or to the body of the reply e-mail and forward the reply e-mail to the sender without filtering. The sender's e-mail client program can then filter the e-mail based upon criteria the sender has supplied.

Because the alias source address is keyed to the destination address of the sender-originated e-mail, the sender can filter incoming reply e-mail destined for a particular alias source address and be assured that his other alias source addresses are unaffected. The recipient has no leeway to alter the alias source address if he wants the reply e-mail to be delivered to the appropriate sender. Thus, unwelcome reply e-mail cannot disguise itself.

Although the present invention has been described in detail, those skilled in the art should understand that they can make various changes, substitutions and alterations herein without departing from the spirit and scope of the invention in its broadest form.

What is claimed is:

1. A system for generating an alias source address for an electronic mail (e-mail) message having a real source and a destination address, comprising:

an alias source address generator that employs said destination address to generate said alias source address;

an alias source address substitutor that substitutes said alias source address for said real source address, wherein said real source address is removed from said e-mail message; and an e-mail filter configured to filter incoming reply mail by decoding a recipient address of said incoming reply mail to determine said destination address for which said alias source address was originally generated and validating said destination address against a sender address of said incoming reply mail to ensure said incoming reply mail originated from said destination address.

2. The system as recited in claim 1 wherein said alias source address generator employs a real source address of said e-mail message and said destination address to generate said alias source address.

3. The system as recited in claim 2 wherein said alias source address generator compresses said real source address to generate said alias source address.

4. The system as recited in claim 1 wherein said alias source address generator employs a secret key to generate said alias source address.

5. The system as recited in claim 1 further comprising:

a real source address generator that generates a real source address from said alias source address; and a real source address substitutor, coupled to said real source address generator, that substitutes said real source address for said alias source address, said real source address generator and substitutor capable of cooperating to allow e-mail directed to said alias source address to be routed to said real source address, said system functioning as an e-mail forwarder.

6. The system as recited in claim 1 wherein said alias source address is longer than said real source address.

7. A method of generating an alias source address for an electronic mail (e-mail) message having a real source address and a destination address, comprising the steps of:

generating said alias source address based on said destination address;

substituting said alias source address for said real source address, wherein said real source address is removed from said e-mail message; and filtering incoming reply mail by decoding a recipient address of said incoming reply mail to determine said destination address for which said alias source address was originally generated and validating said destination address against a sender of said incoming reply mail to ensure said incoming reply mail originated from said destination.

8. The method as recited in claim 7 wherein said step of employing comprises the step of employing a real source address of said e-mail message and said destination address to generate said alias source address.

9. The method as recited in claim 8 wherein said step of employing comprises the step of compressing said real source address to generate said alias source address.

10. The method as recited in claim 7 wherein said step of employing comprises the step of employing a secret key to generate said alias source address.

11. The method as recited in claim 7 further comprising the steps of:

generating a real source address from said alias source address; and substituting said real source address for said alias source address to allow e-mail directed to said alias source address to be routed to said real source address thereby to forward said e-mail.

12. The method as recited in claim 7 wherein said alias source address is longer than said real source address.

13. A remailer for coupling to at least one of a plurality of computer systems of a computer network, for generating an alias source address for, and remailing, an e-mail message, comprising:

an alias source address generator that employs a destination address of said one of said e-mail messages to generate said alias source address;

an alias source address substitutor that substitutes said alias source address for said real source address of said one of said e-mail messages, wherein said real source address is removed from said one of said e-mail messages;

data transmission circuitry that remails said one of said e-mail messages to said destination address; and an e-mail filter configured to filter incoming reply mail by decoding a recipient address of said incoming reply mail to determine said destination address for which said alias source address was originally generated and validating said destination address against a sender address of said incoming reply mail to ensure said incoming reply mail originated from said destination address.

14. The remailer as recited in claim 13 wherein said alias source address generator employs a real source address of said e-mail message and said destination address to generate said alias source address.

15. The remailer as recited in claim 14 wherein said alias source address generator compresses said real source address to generate said alias source address.

16. The remailer as recited in claim 13 wherein said alias source address generator employs a secret key to generate said alias source address.

17. The remailer as recited in claim 13 wherein said remailer further includes:

a real source address generator that generates a real source address from said alias source address; and a real source address substitutor, coupled to said real source address generator, that substitutes said real source address for said alias source address, said real source address generator and substitutor capable of cooperating to allow e-mail directed to said alias source address to be routed to said real source address, said remailer thereby functioning as an e-mail forwarder.

18. The remailer as recited in claim 13 wherein said alias source address is longer than said real source address.

19. A system for generating an alias source address for an electronic mail (e-mail) message having a real source address and a destination address, comprising:

an alias source address generator that employs said destination address to generate said alias source address;

an alias source address inserter that places said alias source address in said e-mail message as at least part of an address; and an e-mail filter configured to filter incoming reply mail by decoding a recipient address of said incoming reply mail to determine said destination address for which said alias source address was originally generated and validating said destination address against a sender address of said incoming reply mail to ensure said incoming reply mail originated from said destination address.

20. The system as recited in claim 19 wherein said alias source address generator employs a real source address of said e-mail message and said destination address to generate said alias source address.

21. The system as recited in claim 20 wherein said alias source address generator compresses said real source address to generate said alias source address.

22. The system as recited in claim 19 wherein said alias source address generator employs a secret key to generate said alias source address.

23. The system as recited in claim 19 further comprising:

a real source address generator that generates a real source address from said alias source address; and a real source address inserter, coupled to said real source address generator, that places said real source address in said e-mail message.

24. The system as recited in claim 19 wherein said alias source address is longer than said real source address.

25. A system for generating an electronic mail (e-mail) message that comprises:

a destination address;

a generated alias source address based on said destination address and is at least part of an address of said e-mail message; and an e-mail filter configured to filter incoming reply mail by decoding a recipient address of said incoming reply mail to determine said destination address for which said alias source address was originally generated and validating said destination address against a sender address of said incoming reply mail to ensure said incoming reply mail originated from said destination address.

26. The system as recited in claim 25 wherein said alias source address is a function of said destination address.

27. The system as recited in claim 25 wherein said alias source address is further based on a real source address of said e-mail message.

28. The system as recited in claim 25 wherein said system is operable on an e-mail sender's computer.

29. A method of generating an electronic mail (e-mail) message, comprising the steps of:

placing a destination address on said e-mail message;

generating an alias source address based on said destination address;

placing said alias source address on said e-mail message as at least part of an address of said e-mail message; and filtering incoming reply mail by decoding a recipient address of said incoming reply mail to determine said destination address for which said alias source address was originally generated and validating said destination address against a sender address of said incoming reply mail to ensure said incoming reply mail originated from said destination address.

30. The method as recited in claim 29 wherein said alias source address is a function of said destination address.

31. The method as recited in claim 29 wherein said alias source address is further based on a real source address of said e-mail message.

32. The method as recited in claim 29 wherein said method is carried out in an e-mail sender's computer.

* * * * *